(12) United States Patent
Eischeid

(10) Patent No.: US 8,046,677 B2
(45) Date of Patent: Oct. 25, 2011

(54) DISPLAYING RELATIONSHIPS BETWEEN TABULAR DATA USING SPATIAL IDENTIFIERS

(75) Inventor: Todd M. Eischeid, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1498 days.

(21) Appl. No.: 11/342,915

(22) Filed: Jan. 30, 2006

(65) Prior Publication Data

US 2007/0180417 A1    Aug. 2, 2007

(51) Int. Cl.
G06F 17/00    (2006.01)
(52) U.S. Cl. ........ 715/212; 715/214; 715/215; 715/227; 715/228
(58) Field of Classification Search .......... 715/212–220, 715/227, 228
See application file for complete search history.

(56) References Cited

U.S. PATENT DOCUMENTS

| | | | |
|---|---|---|---|
| 5,615,367 A | 3/1997 | Bennett et al. | |
| 5,778,370 A * | 7/1998 | Emerson | 1/1 |
| 5,835,917 A | 11/1998 | Shin et al. | |
| 5,848,425 A * | 12/1998 | Lowry et al. | 715/205 |
| 6,003,033 A * | 12/1999 | Amano et al. | 1/1 |
| 6,055,515 A | 4/2000 | Consentino et al. | |
| 6,157,934 A * | 12/2000 | Khan et al. | 715/234 |
| 6,185,582 B1 * | 2/2001 | Zellweger et al. | 715/212 |
| 6,496,842 B1 | 12/2002 | Lyness | |
| 7,136,060 B2 * | 11/2006 | Bauer et al. | 345/419 |
| 7,398,476 B2 * | 7/2008 | Talley et al. | 715/769 |
| 7,415,664 B2 * | 8/2008 | Aureglia et al. | 715/212 |
| 7,734,576 B2 * | 6/2010 | Simon et al. | 707/602 |
| 2002/0023105 A1 * | 2/2002 | Wisniewski | 707/503 |
| 2002/0049763 A1 | 4/2002 | Seamon | |
| 2002/0091728 A1 * | 7/2002 | Kjaer et al. | 707/503 |
| 2002/0154177 A1 | 10/2002 | Barksdale et al. | |
| 2002/0191033 A1 | 12/2002 | Roberts | |
| 2002/0191483 A1 | 12/2002 | Ohtsuki et al. | |
| 2003/0061225 A1 | 3/2003 | Bowman et al. | |
| 2003/0135483 A1 | 7/2003 | Sharp et al. | |
| 2003/0172049 A1 | 9/2003 | Choy et al. | |
| 2003/0225761 A1 | 12/2003 | Wagener et al. | |
| 2004/0196310 A1 * | 10/2004 | Aamodt et al. | 345/738 |
| 2005/0027724 A1 | 2/2005 | Minamino et al. | |
| 2005/0060647 A1 | 3/2005 | Doan et al. | |
| 2005/0138052 A1 | 6/2005 | Zhou et al. | |
| 2005/0160379 A1 * | 7/2005 | Roberts | 715/853 |
| 2006/0004618 A1 * | 1/2006 | Brixius | 705/8 |
| 2006/0080594 A1 * | 4/2006 | Chavoustie et al. | 715/503 |
| 2006/0101324 A1 * | 5/2006 | Goldberg et al. | 715/503 |
| 2006/0195780 A1 * | 8/2006 | Zuccolotto et al. | 715/503 |
| 2006/0200372 A1 * | 9/2006 | O'Cull et al. | 705/8 |

FOREIGN PATENT DOCUMENTS

JP    2000172729 A    6/2000

OTHER PUBLICATIONS

Tim Pyron, Special Edition Using Microsoft® Project 2002, Aug. 5, 2002, QUE.*

(Continued)

*Primary Examiner* — Stephen Hong
*Assistant Examiner* — I-Chan Yang
(74) *Attorney, Agent, or Firm* — Kunzler Needham Massey & Thorpe

(57) ABSTRACT

A system and method of spatial/tabular data presentation. Display data is identified for display. Relations for the display data are identified. The display data is displayed in a data display having a tabular column and a spatial column. Data identifiers are displayed in the tabular column and spatial identifiers connected with spatial connectors according to the relations are displayed in the spatial column.

19 Claims, 10 Drawing Sheets

OTHER PUBLICATIONS

Billingsley, P.A., "Navigation Through Hierarchical Menu Structures: Does it Help to Have a Map?", Proceeding of the Human Factors Society—26th Annual Meeting, 1982, pp. 103-107.

Wickens, C. D, Engineering Psychology and Human Performance, 2nd Edition, New York: Harper Colllins, 1992, pp. 154-160.

Jones, W.P., & Dumais, S.T. "The spatial metaphor for user interfaces: Experimental tests of reference by location versus name"., Jan. 1986 ACM Transactions on Office Information Systems, vol. 4, No. 1, pp. 42-63.

Mandler, J.M. Seegmiller, D., & Day, J. "On the coding of spatial information". Memory and Cognition, 1977, vol. 5, pp. 10-16.

* cited by examiner

| Name | Capacity (foos) | Status | Last Access | Connections |
|---|---|---|---|---|
| Item 6 | 89 | Normal | 17 Mar 2005 | |
| Item 11 | 66 | Attention | 13 Apr 2005 | |
| Item 22 | 26 | Critical | 31 Mar 2005 | |
| Item 3 | 20 | Attention | 26 Mar 2005 | |
| Item 20 | 67 | Normal | 19 Apr 2005 | |
| Item 2 | 110 | Attention | 18 Mar 2005 | |
| Item 14 | 11 | Normal | 21 Apr 2005 | |
| Item 17 | 0 | Normal | 25 Apr 2005 | |
| Item 23 | 11 | Critical | 22 Apr 2005 | |
| Item 36 | 17 | Normal | 14 Apr 2005 | |
| Item 1 | 45 | Normal | 17 Apr 2005 | |
| Item 5 | 66 | Normal | 11 Apr 2005 | |
| Item 4 | 45 | Normal | 29 Mar 2005 | |
| Item 7 | 90 | Normal | 07 Apr 2005 | |
| Item 8 | 17 | Normal | 19 Mar 2005 | |
| Item 9 | 23 | Normal | 24 Mar 2005 | |
| Item 12 | 11 | Normal | 12 Mar 2005 | |
| Item 13 | 17 | Critical | 16 Mar 2005 | |
| Item 15 | 8 | Attention | 23 Mar 2005 | |
| Item 16 | 78 | Normal | 09 Apr 2005 | |
| Item 18 | 45 | Normal | 15 Mar 2005 | |
| Item 19 | 17 | Normal | 23 Mar 2005 | |
| Item 21 | 12 | Normal | 20 Mar 2005 | |
| Item 24 | 40 | Attention | 20 Apr 2005 | |
| Item 25 | 45 | Normal | 15 Apr 2005 | |
| Item 26 | 17 | Normal | 08 Apr 2005 | |
| Item 27 | 45 | Normal | 02 Apr 2005 | |
| Item 28 | 26 | Normal | 21 Apr 2005 | |
| Item 29 | 90 | Attention | 27 Mar 2005 | |
| Item 30 | 50 | Normal | 03 Apr 2005 | |
| Item 31 | 12 | Normal | 22 Mar 2005 | |
| Item 32 | 12 | Attention | 16 Apr 2005 | |
| Item 33 | 45 | Attention | 13 Mar 2005 | |
| Item 34 | 44 | Critical | 25 Mar 2005 | |

Fig. 7

DISPLAYING RELATIONSHIPS BETWEEN TABULAR DATA USING SPATIAL IDENTIFIERS

FIELD OF INVENTION

The present invention relates generally to data presentation, and particularly, to a system and method of spatial/tabular data presentation.

BACKGROUND OF THE INVENTION

Data presentation, such as data presentation in a graphic user interface (GUI) on a display device of a computer system, is important to allow the user to understand, interpret, and use the data. Presently, data is provided in either tabular layouts, such as spreadsheets, or spatial layouts, such as trees. Tabular layouts have the disadvantage that it is difficult for the user to identify relationships between and among the data in the table. Users are unable to trace paths connecting the data in the table. Spatial layouts, such as topology viewers in systems management consoles, have the disadvantage that it is difficult for the user to scan and sort the individual pieces of data. Users can become disoriented, rendering them unable to locate a particular piece of data when the spatial layout becomes too large or too complex. Such confusion can hinder troubleshooting of problems.

A single layout lacks the flexibility to allow the user to respond efficiently to all situations in which they need to identify and interpret data. One particular type of layout may be better suited to one particular task than another. For example, studies of airline reservation systems have shown that questions involving spatial relationships, such as how to get from one location to another, are more easily answered from a spatial layout of data. Questions involving verbal concepts, such as how many flights would arrive at a particular time, are more easily answered from a tabular layout of data.

It would be desirable to have system and method of spatial/tabular data presentation that would overcome the above disadvantages.

SUMMARY OF THE INVENTION

The present invention provides a system and method of spatial/tabular data presentation. Display data are identified for display. Relations for the display data are identified. The display data are displayed in a data display having a tabular column and a spatial column. Data identifiers are displayed in the tabular column and spatial identifiers connected with spatial connectors according to the relations are displayed in the spatial column.

One aspect of the present invention provides a method of displaying data including identifying display data for display, the display data having first display data and second display data; identifying relations for the display data; displaying the display data in a data display having a tabular column and a spatial column, the tabular column having a first tabular cell and a second tabular cell, and the spatial column having a first spatial cell and a second spatial cell, the first tabular cell being associated with the first spatial cell in a first data display row, the second tabular cell being associated with the second spatial cell in a second data display row; displaying a first data identifier for the first display data in the first spatial cell; displaying a first spatial identifier for the first display data in the first spatial cell; displaying a second data identifier for the second display data in the second spatial cell; displaying a second spatial identifier for the second display data in the second spatial cell; and displaying a spatial connector connecting the first spatial identifier and the second spatial identifier according to the relations.

Another aspect of the present invention provides an information handling system including a processor; a memory coupled to said processor to store instructions executable by a digital processing apparatus to perform operations to display data. The operations include identifying display data for display in a display window, the display data having first display data and second display data; identifying relations for the display data; displaying the display data in a data display having a tabular column and a spatial column, the tabular column having a first tabular cell and a second tabular cell, and the spatial column having a first spatial cell and a second spatial cell, the first tabular cell being associated with the first spatial cell in a first data display row, the second tabular cell being associated with the second spatial cell in a second data display row; displaying a first data identifier for the first display data in the first spatial cell; displaying a first spatial identifier for the first display data in the first spatial cell; displaying a second data identifier for the second display data in the second spatial cell; displaying a second spatial identifier for the second display data in the second spatial cell; and displaying a spatial connector connecting the first spatial identifier and the second spatial identifier according to the relations.

Yet another aspect of the present invention provides a computer program product embodied in a computer readable medium storing a computer program executable by a digital processing apparatus to perform operations to display data. The operations include identifying display data for display in a display window, the display data having first display data and second display data; identifying relations for the display data; displaying the display data in a data display having a tabular column and a spatial column, the tabular column having a first tabular cell and a second tabular cell, and the spatial column having a first spatial cell and a second spatial cell, the first tabular cell being associated with the first spatial cell in a first data display row, the second tabular cell being associated with the second spatial cell in a second data display row; displaying a first data identifier for the first display data in the first spatial cell; displaying a first spatial identifier for the first display data in the first spatial cell; displaying a second data identifier for the second display data in the second spatial cell; displaying a second spatial identifier for the second display data in the second spatial cell; and displaying a spatial connector connecting the first spatial identifier and the second spatial identifier according to the relations.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

BRIEF DESCRIPTION OF THE DRAWINGS

FIGS. 6 and 7 are diagrams of spatial/tabular data presentation with sorting in accordance with the present invention;

DESCRIPTION OF PRESENTLY PREFERRED EMBODIMENTS

Figure 1:
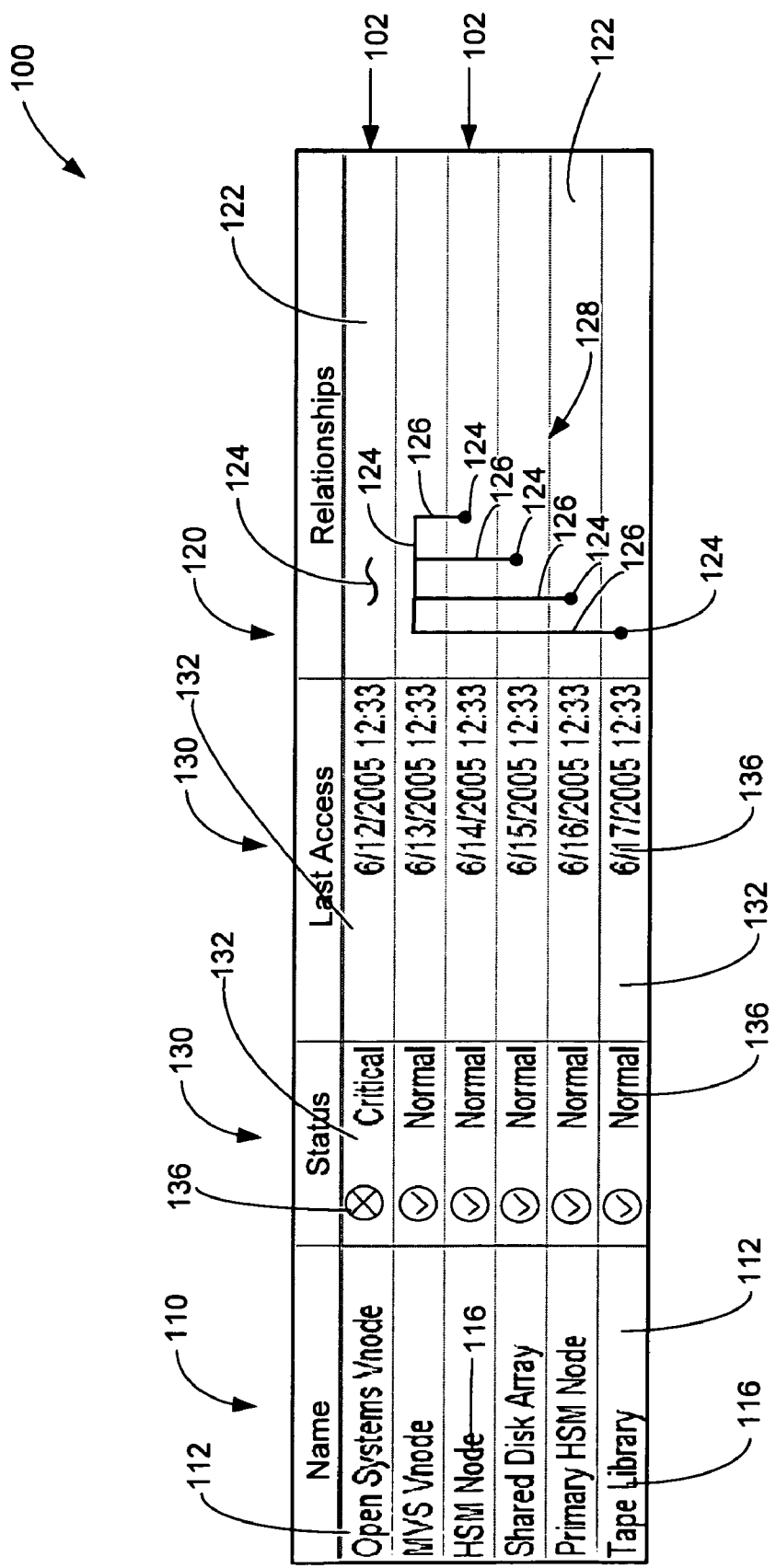
FIG. 1 is a diagram of spatial/tabular data presentation in accordance with the present invention.

FIG. 1 is a diagram of spatial/tabular data presentation in accordance with the present invention. The data display 100 includes a tabular column 110 and a spatial column 120. The tabular column 110 displays data in a table format and the spatial column 120 displays relations between the displayed data. As used herein, a relation is defined as any association between two things. Examples of relations include connections between components, connections between persons, links between organizations, correlations between data, physical connections between computers, physical connections between a server and a storage subsystem, logical connections such as between a logical volume and a server, and the like. The tabular column 110 has a number of tabular cells 112. The spatial column 120 has a number of spatial cells 122. Each of the spatial cells 122 is associated with one of the tabular cells 112 of the tabular column 110 in a data display row 102. In one embodiment, the data display 100 includes one or more supplementary tabular column 130 with a number of supplementary tabular cells 132. Each of the supplementary tabular cells 132 is associated with one of the tabular cells 112 of the tabular column 110 in a data display row 102.

The display data to be displayed in the data display 100 can be identified from a data set for display on a display device. The display data has data identifiers 116, such as device names, and can have supplementary data 136, such as status and access dates. The relations can be identified for the display data, identifying relations such as connections between the data identifiers 116. A data identifier 116 for one of the display data is displayed in each of the tabular cells 112. A spatial identifier 124 for one of the display data is displayed in the each of the spatial cells 122 as part of a relation group 128, which includes one or more spatial identifiers 124 and spatial connectors 126 when there is more than one spatial identifier 124 in the relation group 128. The data identifier 116 and the spatial identifier 124 for one of the display data are displayed in one of the data display rows 102, so each data display row 102 displays information for one data identifier 116. In one embodiment, supplementary data 136 for one of the display data is displayed in each of the tabular cells 112. The data identifier 116 and the supplementary data 136 for one of the display data are displayed in one of the data display rows 102, so each data display row 102 displays information for one data identifier 116. At least one spatial connector 126 is displayed connecting the spatial identifiers 124 according to the relations. When the spatial identifier 124 is connected to more than one other spatial identifier 124, the spatial identifier 124 can be displayed as a common spatial identifier. When the spatial identifier 124 is connected to no other spatial identifier 124, the spatial identifier 124 can be displayed as a blank spatial identifier, i.e., the spatial cells 122 can be left empty.

The example of FIG. 1 is a spatial/tabular data display for a virtual storage tape library. Data for the virtual storage tape library is displayed in the tabular column 110 and relations between the data are displayed in the spatial column 120. The names of the computer components (Open System Vnode, MVS Vnode, HSM Node, Shared Disk Array, Primary HSM Node, and Tape Library) are used as the data identifiers 116 and displayed in the tabular cells 112 in the first column. In this embodiment, the status (Critical, Normal, with associated graphic symbol) and the last access time (date and time) are supplementary data 136 and displayed in the supplementary tabular cells 132 in the supplementary tabular columns 130.

Relations between the data are the computer component connections displayed in the spatial column 120. The Open System Vnode is not related to any other component, so the spatial identifier 124 is a blank spatial identifier displayed in the spatial cell 122 in the data display rows 102 displaying the Open System Vnode as the data identifier 116. In another embodiment, a visible spatial identifier 124 is displayed in the spatial cell 122 in the data display rows 102 displaying the Open System Vnode as the data identifier 116, but no spatial connector is attached to the spatial identifier 124 since the Open System Vnode is not related to any other component. The MVS Vnode is related to four other components, so the spatial identifier 124 is a common spatial identifier, displayed as a horizontal bar in the spatial cell 122. The spatial identifier 124 for MVS Vnode is connected to the spatial identifiers 124 of the related components (HSM Node, Shared Disk Array, Primary HSM Node, and Tape Library) with spatial connectors 126 to the four other components, displayed as vertical lines across the spatial cells 122.

The data display 100 can be sorted by the data identifiers 116 displayed in the tabular column 110 and/or the relations between the data displayed in the spatial column 120. In one embodiment, data display 100 can be sorted by the supplementary data 136 displayed in the supplementary tabular column 130. The data display rows 102 move with the sorted value so that associated information remains within the individual data display row 102. In the virtual storage tape library example of FIG. 1, the data display 100 can be sorted by the data identifiers 116 which are the names of the computer components (Open System Vnode, MVS Vnode, HSM Node, Shared Disk Array, Primary HSM Node, and Tape Library), supplementary data 136 which are the status (Critical, Normal, with associated graphic symbol) or the last access time (date and time), or spatial identifiers 124 which show the computer component connections.

The spatial identifiers and spatial connectors can be any graphics symbols suitable for displaying identity and relations on a data display. In one embodiment, the spatial identifiers are selected from ball spatial identifiers connected to a single spatial connector, a common spatial identifier connected to multiple spatial connectors, and a blank spatial identifier connected to no spatial connectors. In one embodiment, the common spatial identifiers are horizontal bars. The spatial identifiers can convey additional information besides the relations by including additional graphic elements, such as an icon, fill, color, pattern, animation, combinations thereof, and the like. For example, the spatial identifier can be a clock icon for a time sensitive spatial identifier, having a green color for normal conditions, a red color for abnormal conditions, and blinking for emergency abnormal conditions. The status of the additional graphic elements can be determined by values of associated supplementary data in the supplementary tabular column 130. In one embodiment, the spatial connectors are generally vertical lines. The pattern of the spatial connectors in the spatial column 120 for the relation groups can be laid out so that the spatial connectors do not cross. The spatial connectors can also convey additional information by including additional graphic elements, such as an icon, fill, color, pattern, animation, combinations thereof, and the like. For example, a spatial connector can display the status of a cable connection between two pieces of equipment.

Those skilled in the art will appreciate that the spatial/tabular data presentation can be used for any data having relations and is not limited to display of computer components and computer component connections. The spatial/tabular data presentation can be used for any data to show data identifiers and optional supplementary data in a table format and relations between the data in a spatial format. For example, a spatial/tabular data presentation can be used to show data for employees at a company in the tabular column 110 and supplementary tabular column 130, and communications between employees in the spatial column 120. In the tabular column 110 and supplementary tabular column 130, each employee's last name can be displayed as a data identifier, and the employee's first name, office, e-mail address, and phone number can be displayed as supplementary data. In the spatial column 120, the relation groups can display all of the other employees a particular employee called on the phone or sent e-mail. Such a representation would be useful for phone or e-mail administrators wishing to visualize those relations.

Figure 2:
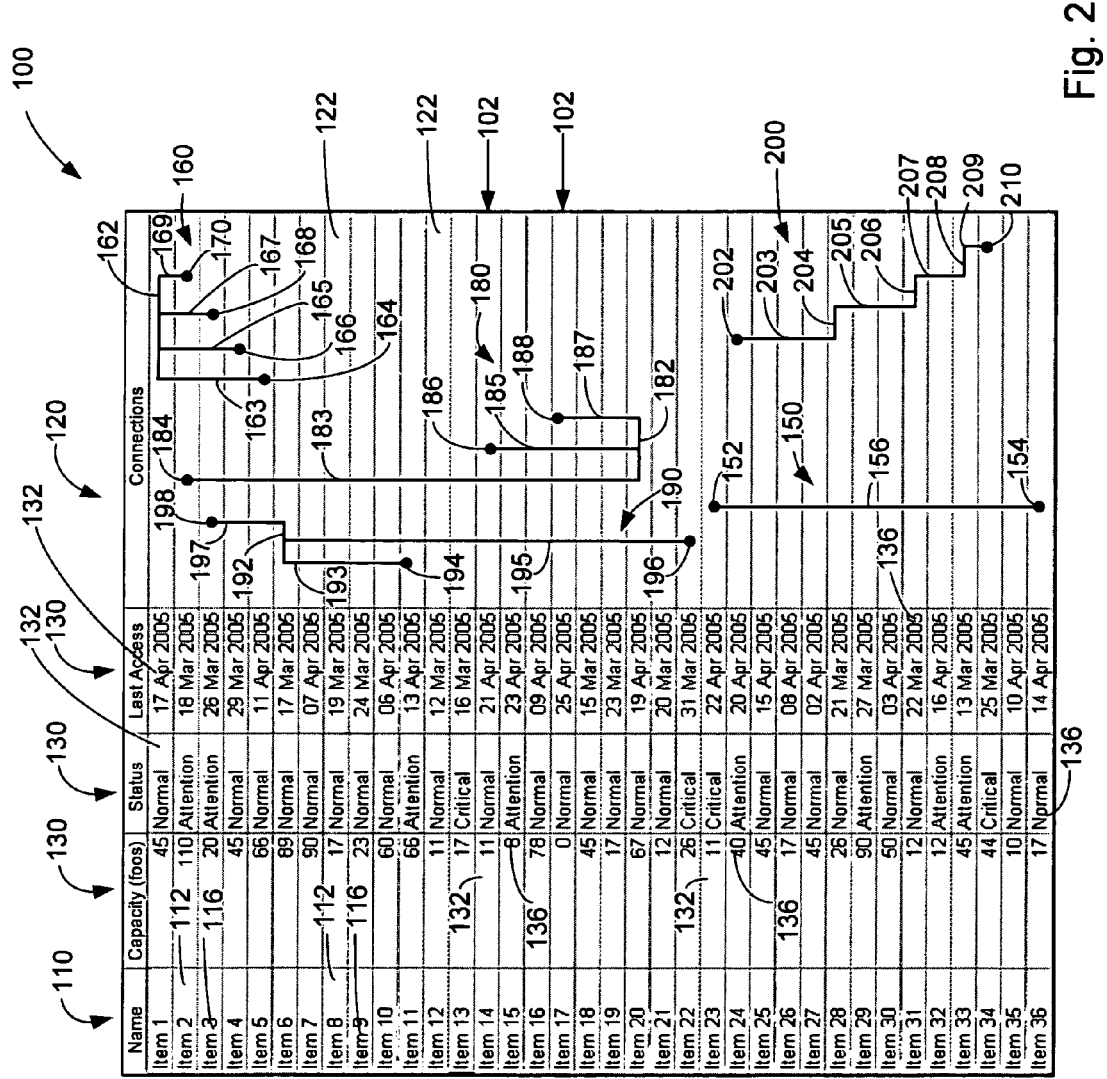
FIG. 2 is a diagram of spatial/tabular data presentation with various relation groups in accordance with the present invention.

FIG. 2, in which like elements share like reference numbers with FIG. 1, is a diagram of spatial/tabular data presentation with various relation groups in accordance with the present invention.

Relation group 150 includes a spatial identifier 152 for data identifier Item 23, a spatial identifier 154 for data identifier Item 36, and a spatial connector 156 connecting the spatial identifier 152 and the spatial identifier 154. In this embodiment, the spatial identifiers 152 and 154 are ball spatial identifiers because there is only the single relation between the data identifier Item 23 and the data identifier Item 36. The spatial connector 156 is a vertical line spatial connector.

Relation group 160 includes a spatial identifier 162 for data identifier Item 1, a spatial identifier 164 for data identifier Item 5 connected to the spatial identifier 162 by spatial connector 163, a spatial identifier 166 for data identifier Item 4 connected to the spatial identifier 162 by spatial connector 165, a spatial identifier 168 for data identifier Item 3 connected to the spatial identifier 162 by spatial connector 167, and a spatial identifier 170 for data identifier Item 2 connected to the spatial identifier 162 by spatial connector 169. In this embodiment, the spatial identifiers 164, 166, 168, and 170 are ball spatial identifiers because there is only the single relation between the data identifier Item 1 and each of the data identifiers Item 2, Item 3, Item 4, and Item 5. The spatial connectors 163, 165, 167, and 169 are vertical line spatial connectors. The spatial identifier 162 is a common spatial identifier because of the multiple relations between the data identifier Item 1 and the data identifiers Item 2, Item 3, Item 4, and Item 5. In this embodiment, the common spatial identifier is a horizontal bar with evenly spaced spatial connectors descending from the horizontal bar. Because the spatial connectors are evenly spaced, the length of the horizontal bar indicates the number of relations associated with the data identifier Item 1, i.e., a longer horizontal bar indicates more connections.

Relation group 180 includes a spatial identifier 182 for data identifier Item 20, a spatial identifier 184 for data identifier Item 2 connected to the spatial identifier 182 by spatial connector 183, a spatial identifier 186 for data identifier Item 14 connected to the spatial identifier 182 by spatial connector 185, and a spatial identifier 188 for data identifier Item 17 connected to the spatial identifier 182 by spatial connector 187. In this embodiment, the spatial identifiers 184, 186, and 188 are ball spatial identifiers because there is only the single relation between the data identifier Item 20 and each of the data identifiers Item 2, Item 14, and Item 17. The spatial connectors 183, 185, and 187 are vertical line spatial connectors. The spatial identifier 182 is a common spatial identifier because of the multiple relations between the data identifier Item 1 and the data identifiers Item 2, Item 14, and Item 17. In another embodiment, the relation group 180 can be joined with the relation group 160 by combining ball spatial identifier 184 and ball spatial identifier 170 into a horizontal line common spatial identifier. The relation group 180 can be moved to the outside of the relation group 160 away from the supplementary columns 130 to prevent the new common spatial identifier from crossing the spatial connectors 163, 165, and 167. Those skilled in the art will appreciate that many combinations of relation groups can be displayed, combining ball spatial identifiers and separating common spatial identifiers as desired for a particular application. One example of such a combination is provided by relation group 300 in FIG. 5.

Referring to FIG. 2, relation group 190 includes a spatial identifier 192 for data identifier Item 6, a spatial identifier 194 for data identifier Item 11 connected to the spatial identifier 192 by spatial connector 193, a spatial identifier 196 for data identifier Item 22 connected to the spatial identifier 192 by spatial connector 195, and a spatial identifier 198 for data identifier Item 3 connected to the spatial identifier 192 by spatial connector 197. In this embodiment, the spatial identifiers 194, 196, and 198 are ball spatial identifiers because there is only the single relation between the data identifier Item 20 and each of the data identifiers Item 11, Item 22, and Item 3. The spatial connectors 193, 195, and 197 are vertical line spatial connectors. The spatial identifier 192 is a common spatial identifier because of the multiple relations between the data identifier Item 6 and the data identifiers Item 11, Item 22, and Item 3.

Relation group 200 includes a spatial identifier 202 for data identifier Item 24, a spatial identifier 204 for data identifier Item 28 connected to the spatial identifier 202 by spatial connector 203, a spatial identifier 206 for data identifier Item 31 connected to the spatial identifier 204 by spatial connector 205, a spatial identifier 208 for data identifier Item 33 connected to the spatial identifier 206 by spatial connector 207, and a spatial identifier 210 for data identifier Item 34 connected to the spatial identifier 208 by spatial connector 209. In this embodiment, the spatial identifiers 202 and 210 are ball spatial identifiers because there is only the single relation for each of the data identifier Item 24 and the data identifier Item 34. The spatial connectors 203, 205, 207, and 209 are vertical line spatial connectors. The spatial identifiers 204, 206, and 208 are common spatial identifiers because each of the data identifiers Item 28, Item 31, and Item 33 has two relations.

The remaining data identifiers (Items 7-10, 12, 13, 15, 16, 18, 19, 21, 25-27, 29, 30, 32, and 35) have no relations and so are displayed as blank spatial identifiers with no connecting spatial connectors.

In one embodiment, the spatial identifiers, supplementary data, and/or the relation groups can be used as or in filter criteria to limit the amount of information presented on the data display. For example, the data display could be filtered to display only relation groups having three or more spatial identifiers. In another example, the data display could be filtered to display only certain data by data identifiers or supplementary data values. In still another example, the data display could be filtered to display only data belonging to a particular relation group. In still another example, the data display could be filtered to display all data connected to or related to a particular spatial connector or spatial identifier.

Figure 3:
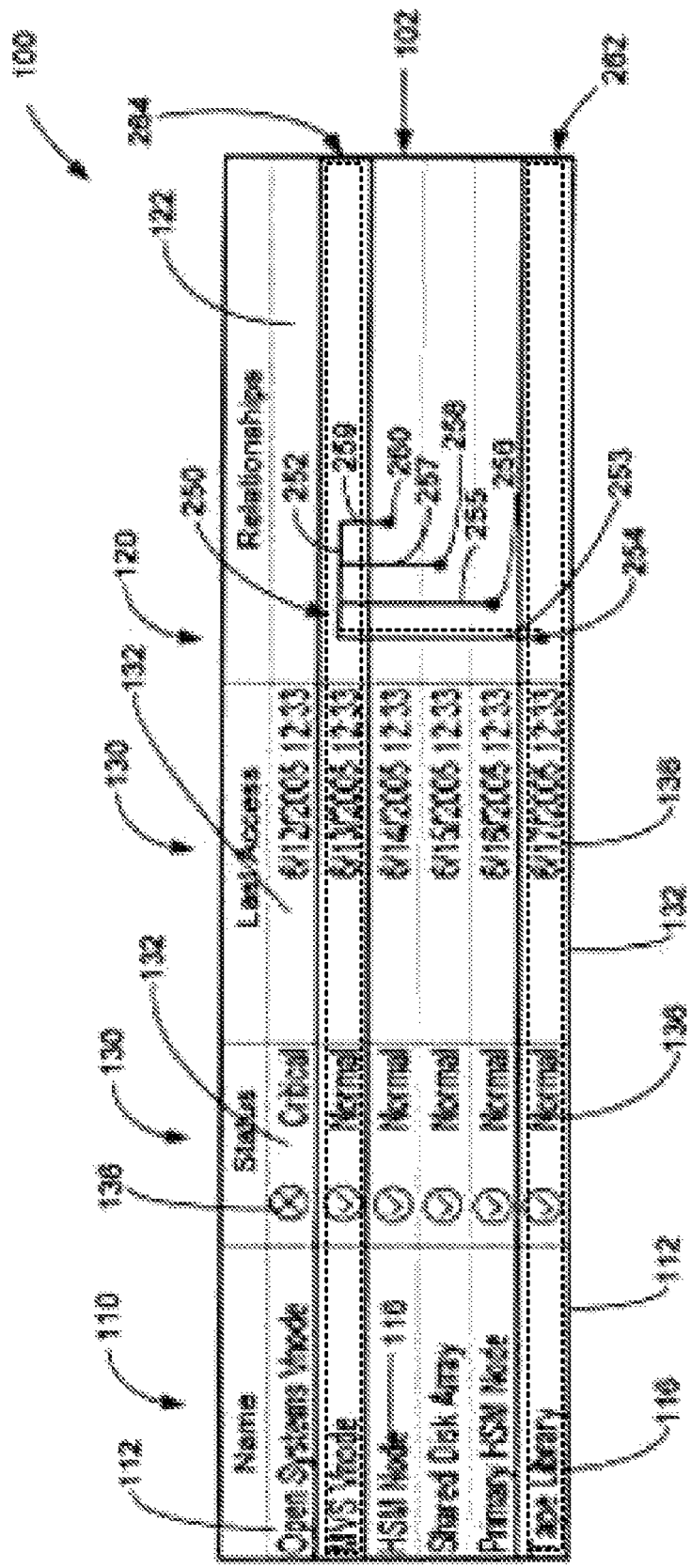
FIGS. 3-5 are diagrams of spatial/tabular data presentation with row highlighting in accordance with the present invention.
Figure 4:
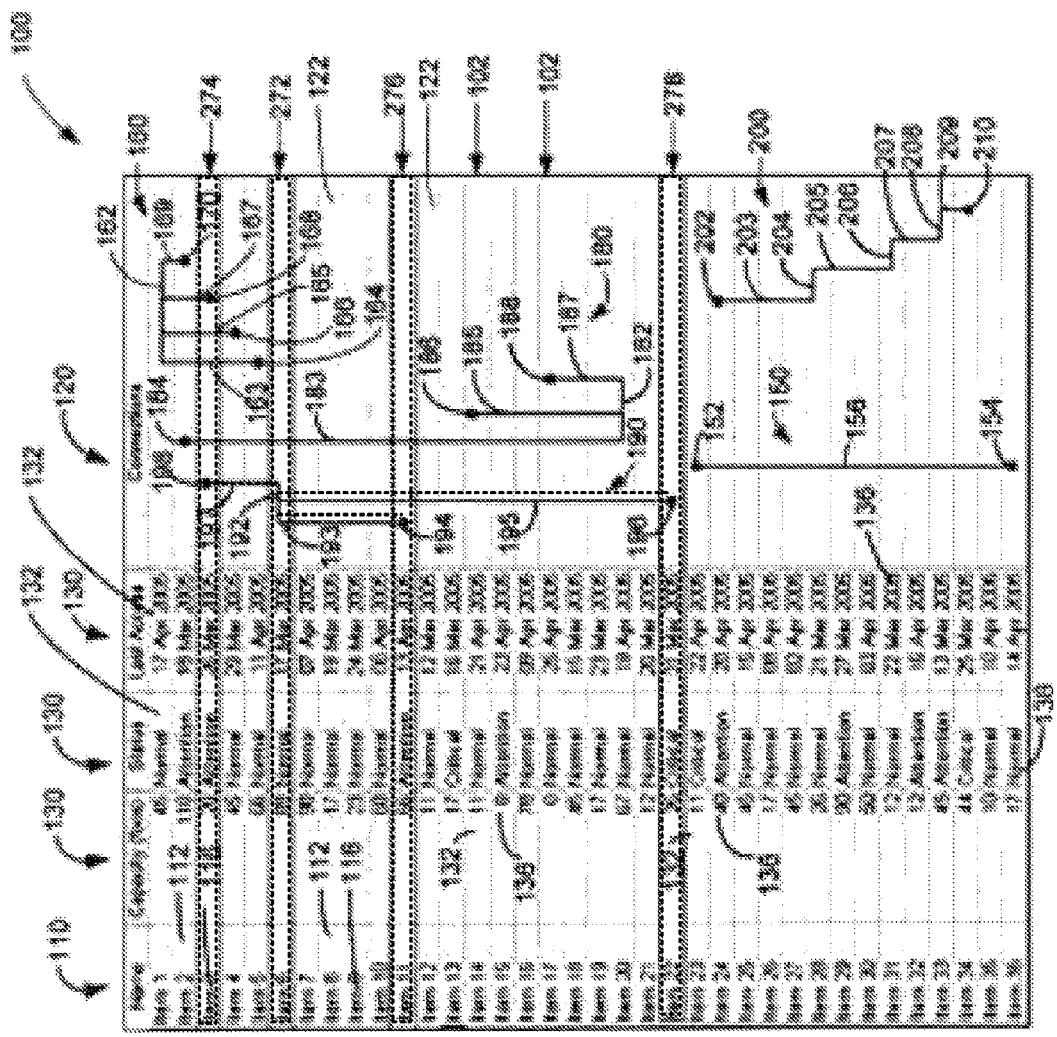
Figure 5:
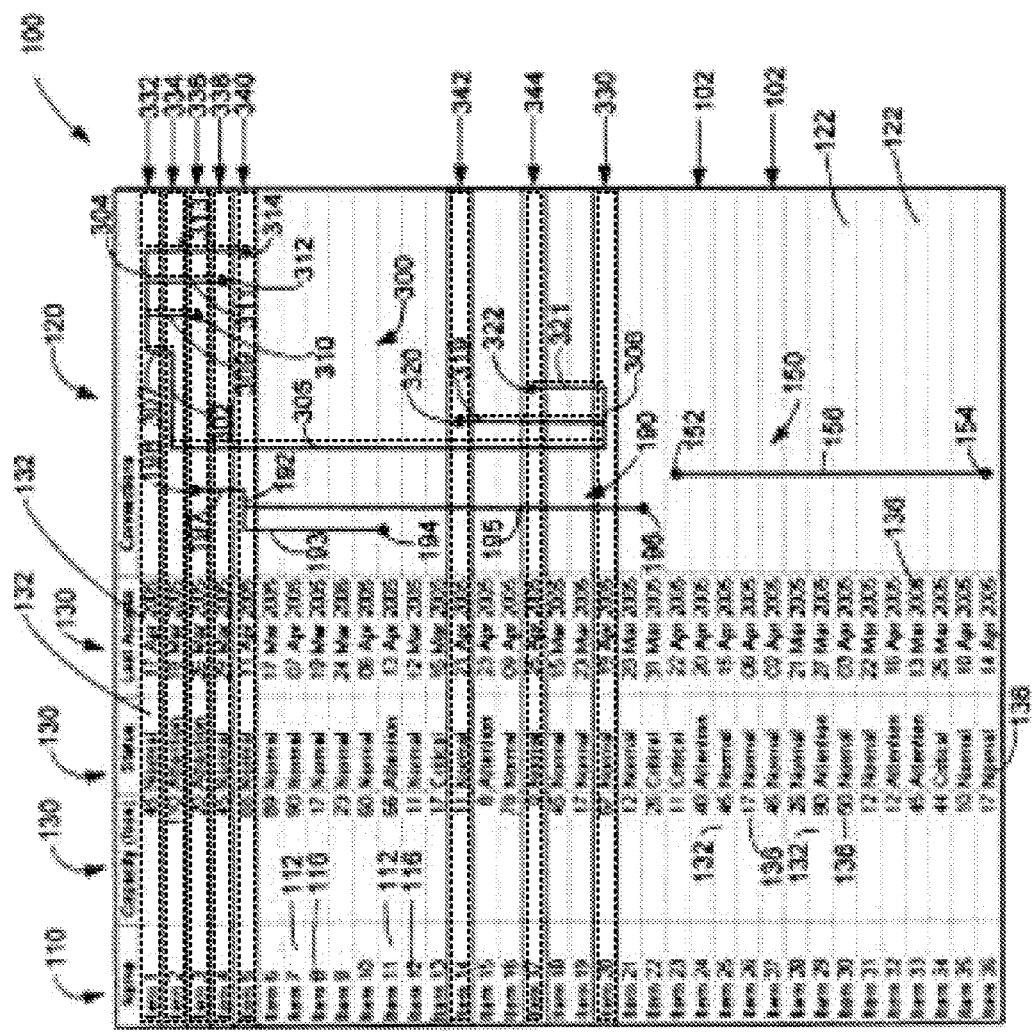

FIGS. 3-5 are diagrams of spatial/tabular data presentation with row highlighting in accordance with the present invention. FIG. 3, in which like elements share like reference numbers with FIG. 1, illustrates row highlighting for a single relation spatial connector. FIG. 4, in which like elements share like reference numbers with FIG. 2, illustrates row highlighting for a multiple relation spatial connector. FIG. 5, in which like elements share like reference numbers with FIG. 2, illustrates row highlighting for all relation spatial connectors in a relation group.

Referring to FIG. 3, the row highlighting can highlight a row including a spatial identifier and a row including a related spatial identifier. The relation group 250 includes a common spatial identifier 252 for data identifier MVS Vnode connected to ball spatial identifier 254 for data identifier Tape Library by spatial connector 253, connected to ball spatial identifier 256 for data identifier Primary HSM Node by spatial connector 255, connected to ball spatial identifier 258 for data identifier Shared Disk Array by spatial connector 257, and connected to ball spatial identifier 260 for data identifier HSM Node by spatial connector 259.

The data display 100 includes a primary highlight of the selected row, a secondary highlight for the row including the directly connected spatial identifier, and a connector highlight for the connector between spatial identifiers. Data display row 262 for data identifier Tape Library has been selected in this example, so the data display row 262 is highlighted with a primary highlight. In this example, the primary highlight is a dark fill in the selected data display row 262. The primary highlight can be any characteristic, such as fill, color, pattern, animation, a combination thereof, or the like, applied to the selected data display row to distinguish the selected data display row from the other data display rows in the data display 100.

In this embodiment, data display row 264 for data identifier MVS Vnode has been highlighted with a secondary highlight in response to the selection of data display row 262. The data display row 264 has a secondary highlight because it includes the common spatial identifier 252 related to the ball spatial identifier 254 in the selected data display row 262. In this example, the secondary highlight is an outline pattern about the secondary selected data display row 264 in the same color as the dark fill of the selected data display row 262. The secondary highlight can be any characteristic, such as fill, color, pattern, animation, a combination thereof, or the like, applied to the secondary selected data display row to distinguish the secondary selected data display row both from the primary selected highlight and from the other data display rows in the data display 100.

In this embodiment, spatial connector 253 has been highlighted with a connector highlight in response to the selection of data display row 262. The spatial connector 253 has a connector highlight because it joins the common spatial identifier 252 and the ball spatial identifier 254 in the selected data display row 262. In this example, the connector highlight is a color matching the color of the dark fill of the selected data display row 262. The connector highlight can be any characteristic, such as fill, color, pattern, animation, a combination thereof, or the like, applied to the spatial connector to distinguish the spatial connector from the other spatial connectors in the data display 100.

Referring to FIG. 4, the row highlighting can highlight a row including a common spatial identifier and rows including related spatial identifiers. The relation group 190 includes a common spatial identifier 192 for data identifier Item 6 connected to ball spatial identifier 194 for data identifier Item 11 by spatial connector 193, connected to ball spatial identifier 196 for data identifier Item 22 by spatial connector 195, and connected to ball spatial identifier 198 for data identifier Item 3 by spatial connector 197.

The data display 100 includes a primary highlight of the selected row and secondary highlights for the rows including the directly connected spatial identifiers, plus connector highlights for the connector between spatial identifiers. Spatial identifier 192 for data identifier Item 6 has been selected in this example, so the data display row 272 is highlighted with a primary highlight. In this example, the primary highlight is a dark fill in the selected data display row 272. In this embodiment, data display row 274 for data identifier Item 3, data display row 276 for data identifier Item 11, and data display row 278 for data identifier Item 22 have been highlighted with a secondary highlight in response to the selection of data display row 272. The data display rows 274, 276, and 278 have secondary highlights because they include ball spatial identifiers 198, 194, and 196, respectively, related to the common spatial identifier 192 in the selected data display row 272. In this example, the secondary highlight is an outline pattern about the secondary selected data display rows 274, 276, and 278. In this embodiment, the spatial connectors 193, 195, and 197 have been highlighted with a connector highlight because they connect the ball spatial identifiers 198, 194, and 196 to the common spatial identifier 192 in the selected data display row 272. In this example, the connector highlight is a color matching the color of the dark fill of the selected data display row 272.

Referring to FIG. 5, the row highlighting can highlight all the rows including spatial identifiers for a particular relation group. The relation group 300 includes common spatial identifier 302 for data identifier Item 2, common spatial identifier 304 for data identifier Item 1 connected to common spatial identifier 302 by spatial connector 303, and common spatial identifier 306 for data identifier Item 20 connected to common spatial identifier 302 by spatial connector 305. The common spatial identifier 304 for data identifier Item 1 is also connected to ball spatial identifier 310 for data identifier Item 3 by spatial connector 309, connected to ball spatial identifier 312 for data identifier Item 4 by spatial connector 311, and connected to ball spatial identifier 314 for data identifier Item 5 by spatial connector 313. The common spatial identifier 306 for data identifier Item 20 is also connected to ball spatial identifier 320 for data identifier Item 14 by spatial connector 319 and connected to ball spatial identifier 322 for data identifier Item 17 by spatial connector 321.

The data display 100 includes a primary highlight of the selected row and secondary highlights for the rows including all the spatial identifiers in the relation group. Data display row 330 for data identifier Item 20 has been selected in this example, so the data display row 330 is highlighted with a primary highlight. In this embodiment, the primary highlight is a dark fill in the selected data display row 330. In this embodiment, data display row 332 for data identifier Item 1, data display row 334 for data identifier Item 2, data display row 336 for data identifier Item 3, data display row 338 for data identifier Item 4, data display row 340 for data identifier Item 5, data display row 342 for data identifier Item 14, and data display row 344 for data identifier Item 17 have been highlighted with a secondary highlight in response to the selection of data display row 272. The data display rows 332, 334, 336, 338, 340, 342, and 344 have secondary highlights because they include spatial identifiers 304, 302, 310, 312, 314, 320, and 322, respectively, related to the common spatial identifier 306 in the selected data display row 330. In this embodiment, the secondary highlight is an outline pattern about the secondary selected data display rows 332, 334, 336, 338, 340, 342, and 344. In this embodiment, the spatial connectors 305, 307, 309, 311, 313, 319, and 321 have been highlighted with a connector highlight because they connect the ball spatial identifiers 320 and 322 to common spatial identifier 306, common spatial identifier 306 to common spatial identifier 302, common spatial identifier 302 to common spatial identifier 304, and common spatial identifier 304 to ball spatial identifiers 310, 312, and 314. In this example, the connector highlight is a color matching the color of the dark fill of the selected data display row 330.

In another embodiment, the span of the highlighting can be limited to a portion of the rows including spatial identifiers for a particular relation group, such as limiting the highlighting to a path of spatial identifiers and spatial connectors for a user-defined number of spatial identifiers from the selected data display row. For example, the user can set the number of spatial identifiers to three, so that three spatial identifiers in one direction from a ball spatial identifier or three spatial identifiers in two directions from a common spatial identifier are highlighted. Limiting the span can focus attention on a desired area of the data display 100 when the relation groups include a large number of spatial identifiers.

Figure 6:
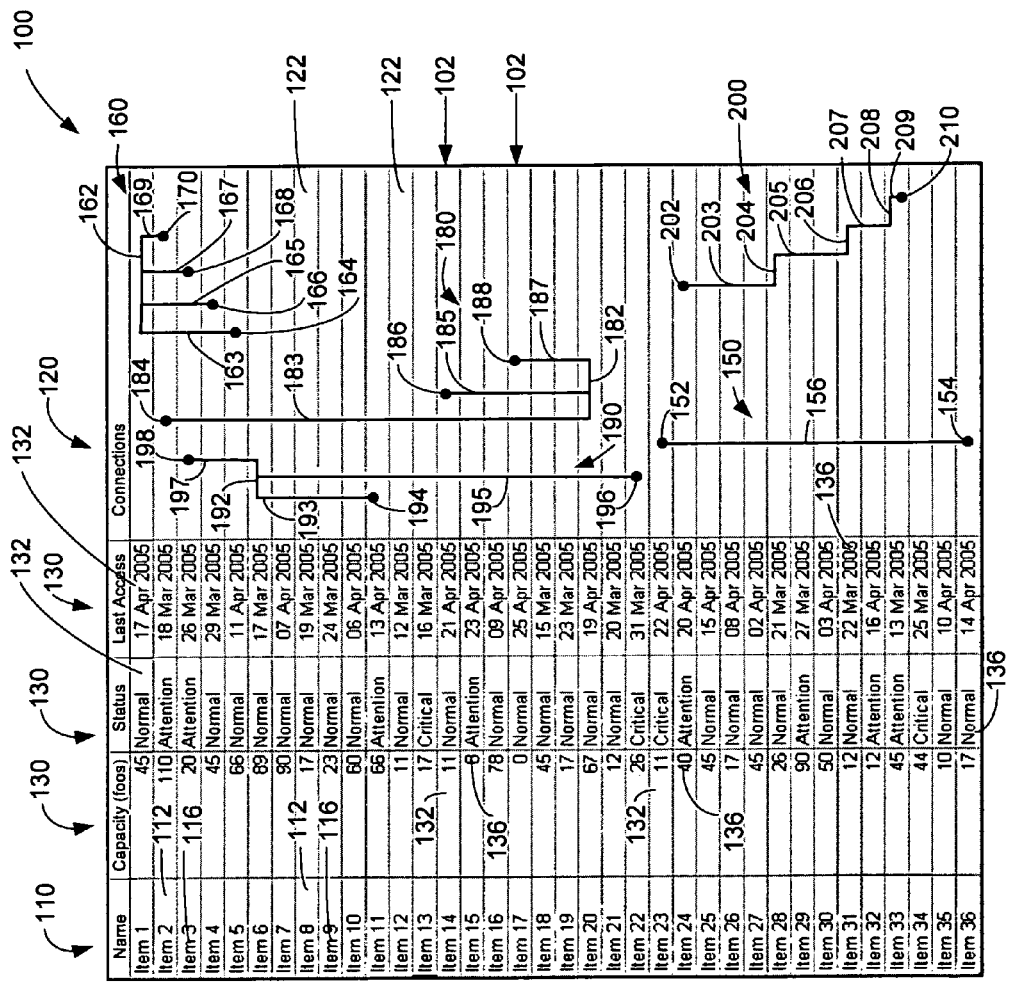

FIGS. 6 and 7, in which like elements share like reference numbers with FIG. 2, are diagrams of spatial/tabular data presentation with sorting in accordance with the present invention. FIG. 6 illustrates sorting by the tabular column 110 and/or the supplementary tabular column. FIG. 7 illustrates sorting by the spatial column.

Referring to FIG. 6, the data display 100 is sorted by the data identifiers 116 in the Name tabular column 110. In this example, the sort is in alphanumeric order. The data display rows 102 are ordered with their associated data identifiers 116 in the Name tabular column 110, i.e., the supplementary data 136 in the supplementary tabular cells 132 and the spatial identifiers in the spatial cells 122, such as spatial identifiers 162, 170, 168, and the like, follow the associated data identifiers 116 when the data identifiers 116 are sorted. The spatial connectors, such as 163, 165, and the like, reconfigure to the new locations of the spatial identifiers after the sort. In another embodiment, the data display 100 is sorted by the supplementary data 136 in one of the supplementary tabular columns 130, such as the Capacity, Status, or Last Access supplementary tabular columns. Those skilled in the art will appreciate that the data in the tabular column 110 and/or the supplementary tabular column 130 can be sorted as desired for a particular application, including ascending or descending sorts, and sorts in alphanumeric, numeric, date order, or the like, as suited to the data identifiers or supplementary data stored in the column. In one embodiment, the sort is initiated by clicking on the header for the tabular column 110, such as the Name tabular column, or one of the supplementary tabular columns 130, such as the Capacity, Status, or Last Access supplementary tabular column.

Referring to FIG. 7, the data display 100 is sorted to minimize the summed length of the spatial connectors in the Connections spatial column 120. The relation group 350 includes spatial identifiers 352, 354, 356, and 358 with spatial connectors 353, 355, and 357. The relation group 360 includes spatial identifiers 362, 364, 366, and 368 with spatial connectors 363, 365, and 367. The relation group 370 includes spatial identifiers 372 and 374 with spatial connector 373. The relation group 380 includes spatial identifiers 382, 384, 386, 388, and 390, with spatial connectors 383, 385, 387, and 389. The sort minimizes the summed length of the spatial connectors 353, 355, 357, 363, 365, 367, 373, 383, 385, 387, and 389, i.e., the sort minimizes the spatial connector summed length. The data display rows 102 are ordered with their associated spatial identifiers in the Connections spatial column 120, i.e., the data identifiers 116 in the tabular cells 112 and the supplementary data 136 in the supplementary tabular cells 132 follow the associated spatial identifiers when the spatial identifiers are sorted. The spatial connectors reconfigure to the new locations of the spatial identifiers after the sort. In one embodiment, the sort is initiated by clicking on the header for the spatial column 120, such as the Connections header.

The primary sort can be performed on criteria for the single relation groups. Examples of other primary sorts besides the sorting to minimize the spatial connector summed length include sorting by the summed length of the spatial connectors in a single relation group, sorting by the number of spatial connectors in a single relation group, sorting by the number of spatial identifiers in a single relation group, and sorting by weighting factors applied to each relation group. In one embodiment, a number of relation groups displayed in the spatial column 120 are ordered across the spatial column 120 by the length of the common spatial identifiers in each of the plurality of relation groups. In another embodiment, a number of relation groups displayed in the spatial column 120 are ordered across the spatial column 120 by the how many different relation groups are associated with the spatial identifiers of the particular relation group. For example, spatial identifier 390 of relation group 380 is associated with relation group 350 through spatial identifier 358 because both have the same data identifier Item 3. Spatial identifier 388 of relation group 380 is associated with relation group 360 through spatial identifier 366 because both have the same data identifier Item 14. Thus, two different relation groups 350, 360 are associated with the spatial identifiers 390, 388 of the particular relation group 380. Relation groups having spatial identifiers associated with the most other relation groups could be placed first in the order, relation groups having spatial identifiers associated with the second most other relation groups could be second in the order, et cetera. This ordering could also be reversed such that those relation groups having spatial identifiers associated with the fewest other relation groups could be placed first in the order.

The sorting can employ secondary sorts as well. For example, the data display 100 sorted to minimize the summed length of the spatial connectors in the Connections spatial column 120 can be further sorted by summed length of the spatial connectors in a single relation group, number of spatial connectors in a single relation group, number of spatial identifiers in a single relation group, weighting factors applied to each relation group, data identifiers 116 in the Name tabular column 110, or supplementary data 136 in one of the supplementary tabular columns 130, such as the Capacity, Status, or Last Access supplementary tabular columns.

Figure 8:
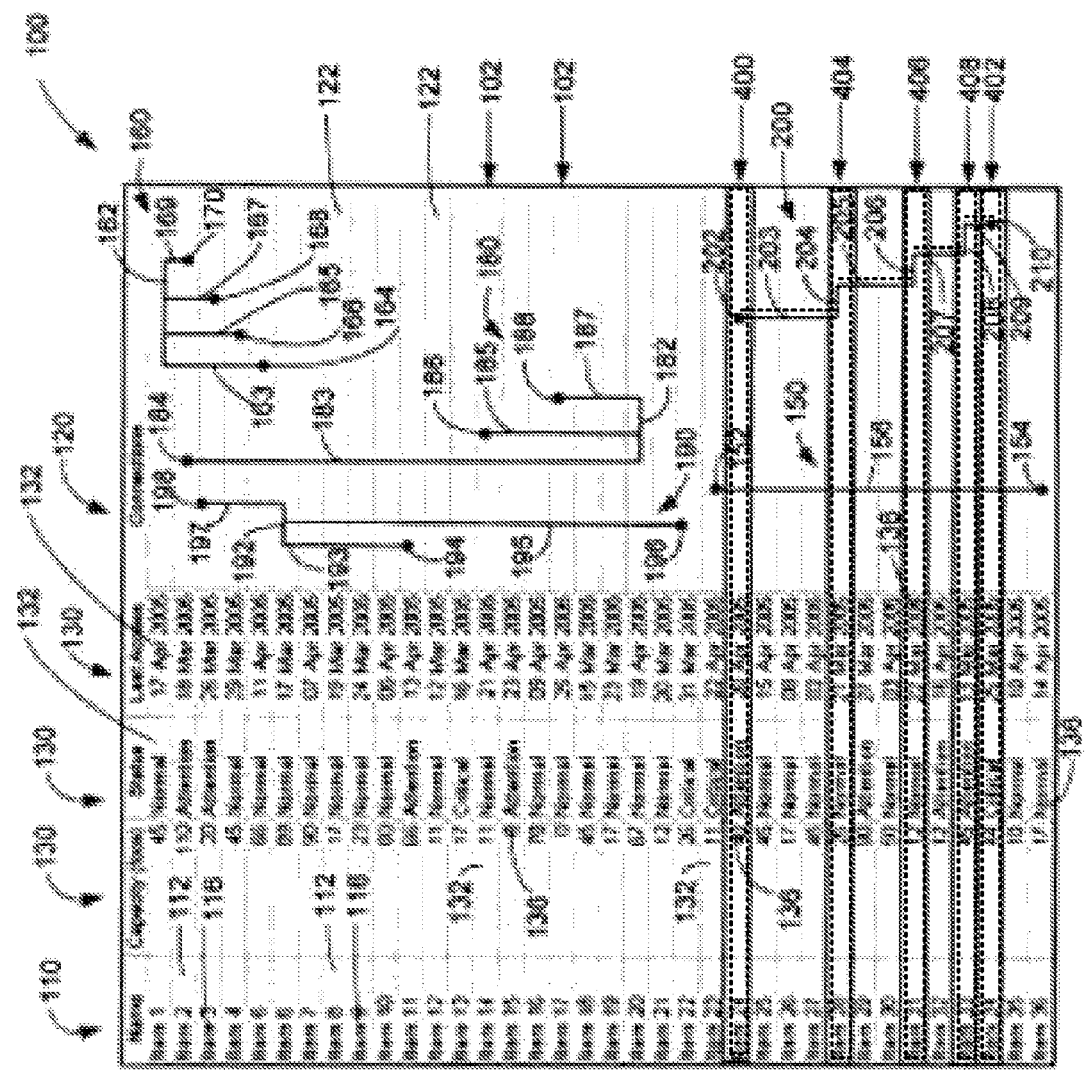
FIGS. 8 and 9 are diagrams of spatial/tabular data presentation with path highlighting in accordance with the present invention.
Figure 9:
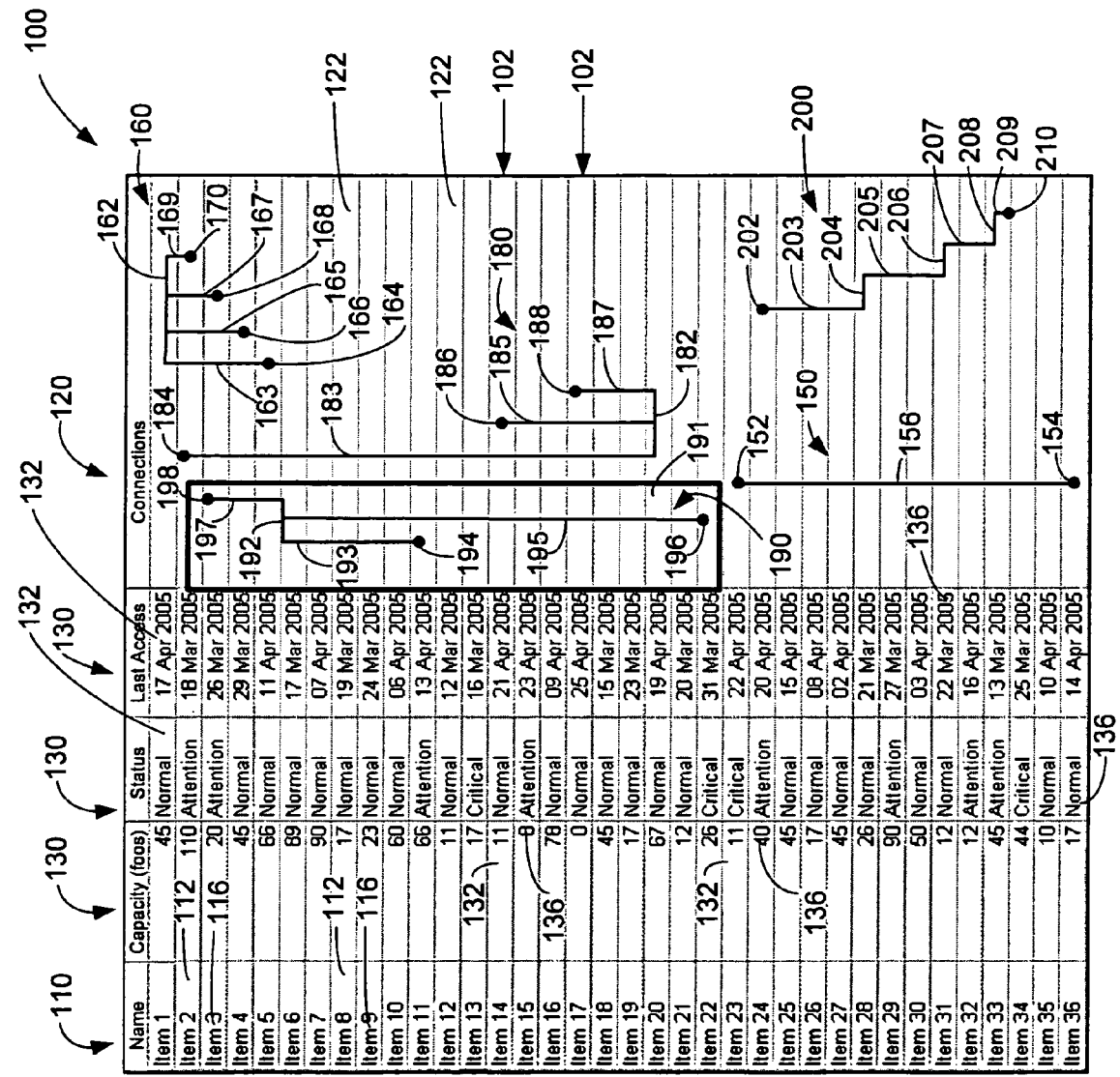

FIGS. 8 and 9, in which like elements share like reference numbers with FIG. 2, are diagrams of spatial/tabular data presentation with path highlighting in accordance with the present invention. FIG. 8 illustrates full path highlighting and FIG. 9 illustrates selected path highlighting.

Referring to FIG. 8, the data display row 400 is selected as a first selected data display row. In one embodiment, the first selected data display row is highlighted with a fill, color, pattern, animation, a combination thereof, or the like, applied to the first selected data display row. In this example, the first selected data display row 400 is highlighted with a dark fill.

The data display row 402 is then selected as a second selected data display row. In one embodiment, the second selected data display row is highlighted with a fill, color, pattern, animation, a combination thereof, or the like, applied to the second selected data display row. In this example, the second selected data display row 402 is highlighted with a bold outline matching the color of the dark fill of the first selected data display row 400. As defined herein, highlighting the full path is defined as highlighting two selected data display rows and all intermediary spatial identifiers and intermediary spatial connectors between the two selected data display rows. In one embodiment, the full path is highlighted automatically in response to selection of the second selected data display row. In another embodiment, the full path is highlighted in response to a command after the second selected data display row is selected. The full path highlighting highlights intermediary data display rows including intermediary spatial identifiers, and intermediary spatial connectors. In one embodiment, the intermediary data display rows are highlighted with a fill, color, pattern, animation, a combination thereof, or the like, applied to the intermediary data display rows. In this example, the intermediary data display rows 404, 406, and 408 are highlighted with a normal outline matching the color of the dark fill of the first selected data display row 400. In one embodiment, the spatial connectors between the first selected data display row and the second selected data display row are highlighted with a fill, color, pattern, animation, a combination thereof, or the like, applied to the spatial connectors. In this example, the spatial connectors 203, 205, 207, and 209 are highlighted with the color of the dark fill of the first selected data display row 400.

Referring to FIG. 9, the relation group 190 is selected with the surrounding area 191 in the spatial column 120 is highlighted with an areal highlight. In one embodiment, the relation group and surrounding area is highlighted with a fill, color, pattern, animation, a combination thereof, or the like, applied to the relation group and the surrounding area. In this example, the relation group 190 and the surrounding area 191 are highlighted with a dark fill rectangle. In one embodiment, the relation group 190 is highlighted in response to selecting the whole relation group 190, such as dragging a selection area around the relation group. In another embodiment, the relation group 190 is highlighted in response to selecting a part of the relation group 190, such as selecting a spatial identifier or a spatial connector in the relation group. Those skilled in the art will appreciate that the highlighting can be any shape desired for a particular application. In one embodiment, the relation group 190 and the surrounding area 191 can display additional information by making a secondary selection, such as by using a mouse to right click on the relation group 190 or the surrounding area 191, to display additional information, such as properties, additions, comments, or the like. In one embodiment, the relation group 190 and the surrounding area 191 can display a menu by making a secondary selection, such as by using a mouse to right click on the relation group 190 or the surrounding area 191, to display a list of menu items for selection.

Figure 10:
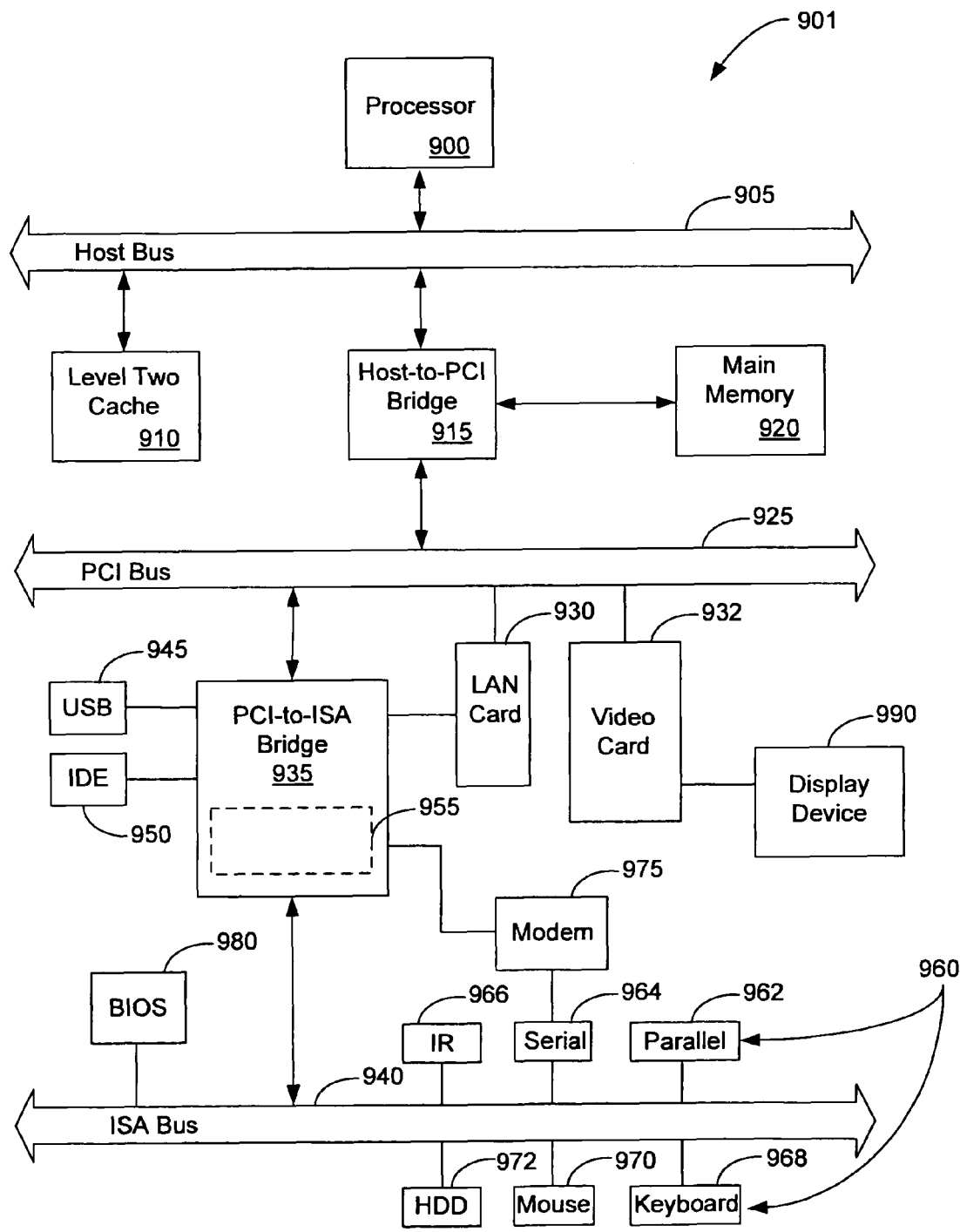
FIG. 10 is a block diagram of an information handling system for implementing spatial/tabular data presentation in accordance with the present invention.

FIG. 10 is a block diagram of an information handling system for implementing spatial/tabular data presentation in accordance with the present invention. The information handling system 901 is a simplified example of a computer system capable of performing the operations described herein. The information handling system 901 includes processor 900 which is coupled to host bus 905. A level two (L2) cache memory 910 is also coupled to the host bus 905. Host-to-PCI bridge 915 is coupled to main memory 920, includes cache memory and main memory control functions, and provides bus control to handle transfers among PCI bus 925, processor 900, L2 cache 910, main memory 920, and host bus 905. The PCI bus 925 provides an interface for a variety of devices including, for example, LAN card 930 and/or video card 932. The video card 932 is operably connected to a display device 990, such as a liquid crystal display (LCD), a cathode ray tube (CRT) display, a projection display, or the like. The display device 990 can be used for spatial/tabular data presentation in accordance with the present invention. Those skilled in the art will appreciate that the video card 932 can be attached to other types of busses, such as an AGP or a PCI Express bus, as desired for a particular application.

PCI-to-ISA bridge 935 provides bus control to handle transfers between the PCI bus 925 and ISA bus 940, universal serial bus (USB) functionality 945, IDE device functionality 950, power management functionality 955, and can include other functional elements not shown, such as a real-time clock (RTC), DMA control, interrupt support, and system management bus support. Peripheral devices and input/output (I/O) devices can be attached to various interfaces 960 (e.g., parallel interface 962, serial interface 964, infrared (IR) interface 966, keyboard interface 968, mouse interface 970, and fixed disk (HDD) 972) coupled to ISA bus 940. Alternatively, a super I/O controller (not shown) can be attached to the ISA bus 940 to accommodate many I/O devices.

BIOS 980 is coupled to ISA bus 940, and incorporates the necessary processor executable code for a variety of low-level system functions and system boot functions. The BIOS 980 can be stored in any computer readable medium, including magnetic storage media, optical storage media, flash memory, random access memory, read only memory, and communications media conveying signals encoding the instructions (e.g., signals from a network). In order to attach information handling system 901 to another computer system to copy files over a network, LAN card 930 is coupled to PCI bus 925 and to PCI-to-ISA bridge 935. Similarly, to connect computer system 901 to an ISP to connect to the Internet using a telephone line connection, modem 975 is connected to serial port 964 and PCI-to-ISA Bridge 935.

While the computer system described in FIG. 10 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program stored on a computer readable medium and executable by a digital processing apparatus to perform operations to display data. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While the embodiments of the invention disclosed herein are presently considered to be preferred, various changes and modifications can be made without departing from the scope of the invention. The scope of the invention is indicated in the appended claims, and all changes that come within the meaning and range of equivalents are intended to be embraced therein.

I claim:

1. A method of displaying data comprising:
   identifying display data for display, the display data comprising first display data and second display data;
   identifying relations for the display data, the relations for the display data comprising a plurality of relations between the first display data and other display data, the other display data including the second display data;
   displaying the display data in a data display having a tabular column and a spatial column, the spatial column offset from the tabular column within the data display, the tabular column having a first tabular cell and a second tabular cell, and the spatial column having a first spatial cell and a second spatial cell, the first tabular cell being associated with the first spatial cell in a first data display row, the second tabular cell being associated with the second spatial cell in a second data display row, wherein the tabular column displays the display data in a tabular form and the spatial column displays the plurality of relations within the display data in a spatial form;
   displaying a first data identifier for the first display data in the first tabular cell;
   displaying, in the first spatial cell, a first spatial identifier representing the first display data, the first spatial identifier comprising a horizontal bar common spatial identifier with a horizontal length, the horizontal length indicating an amount of the plurality of relations between the first display data and the other display data;
   displaying a second data identifier for the second display data in the second tabular cell;
   displaying, in the second spatial cell, a second spatial identifier representing the second display data; and
   displaying a plurality of spatial connectors connecting the first spatial identifier to spatial identifiers for the other display data according to the relations, the spatial identifiers for the other display data including the second spatial identifier.

2. The method of claim 1 wherein the data display has a supplementary tabular column, the supplementary tabular column having a first supplementary tabular cell and a second supplementary tabular cell, the first supplementary tabular cell being associated with the first tabular cell in the first data display row, the second supplementary tabular cell being associated with the second tabular cell in the second data display row, the method further comprising:
   displaying a first supplementary data for the first display data in the first supplementary tabular cell; and
   displaying a second supplementary data for the second display data in the second supplementary tabular cell.

3. The method of claim 1 further comprising:
   selecting the first data display row; and
   highlighting the first data display row in response to the selecting.

4. The method of claim 1 further comprising:
   displaying a plurality of relation groups in the spatial column; and
   ordering the plurality of relation groups across the spatial column by length of common spatial identifiers for each of the plurality of relation groups.

5. An information handling system comprising:
   a processor;
   a memory coupled to said processor to store instructions executable by a digital processing apparatus to perform operations to display data, the operation comprising:
      identifying display data for display, the display data comprising first display data and second display data;
      identifying relations for the display data, the relations for the display data comprising a plurality of relations between the first display data and other display data, the other display data including the second display data;
      displaying the display data in a data display having a tabular column and a spatial column, the spatial column offset from the tabular column within the data display, the tabular column having a first tabular cell and a second tabular cell, and the spatial column having a first spatial cell and a second spatial cell, the first tabular cell being associated with the first spatial cell in a first data display row, the second tabular cell being associated with the second spatial cell in a second data display row, wherein the tabular column displays the display data in a tabular form and the spatial column displays the plurality of relations within the display data in a spatial form;
      displaying a first data identifier for the first display data in the first tabular cell;
      displaying, in the first spatial cell, a first spatial identifier representing the first display data, the first spatial identifier comprising a horizontal bar common spatial identifier with a horizontal length, the horizontal length indicating an amount of the plurality of relations between the first display data and the other display data;
      displaying a second data identifier for the second display data in the second tabular cell;
      displaying, in the second spatial cell, a second spatial identifier representing the second display data; and
      displaying a plurality of spatial connectors connecting the first spatial identifier to spatial identifiers for the other display data according to the relations, the spatial identifiers for the other display data including the second spatial identifier.

6. The system of claim 5 wherein the data display has a supplementary tabular column, the supplementary tabular column having a first supplementary tabular cell and a second supplementary tabular cell, the first supplementary tabular cell being associated with the first tabular cell in the first data display row, the second supplementary tabular cell being associated with the second tabular cell in the second data display row, the operations further comprising:
   displaying a first supplementary data for the first display data in the first supplementary tabular cell; and
   displaying a second supplementary data for the second display data in the second supplementary tabular cell.

7. The system of claim 5, the operations further comprising:
   selecting the first data display row; and
   highlighting the first data display row in response to the selecting.

8. The system of claim 5, the operations further comprising:
   displaying a plurality of relation groups in the spatial column; and
   ordering the plurality of relation groups across the spatial column by length of common spatial identifiers for each of the plurality of relation groups.

9. A computer program product embodied in a computer readable medium storing a computer program executable by a digital processing apparatus to perform operations to display data, the operations comprising:

> identifying display data for display, the display data comprising first display data and second display data;
>
> identifying relations for the display data, the relations for the display data comprising a plurality of relations between the first display data and other display data, the other display data including the second display data;
>
> displaying the display data in a data display having a tabular column and a spatial column, the spatial column offset from the tabular column within the data display, the tabular column having a first tabular cell and a second tabular cell, and the spatial column having a first spatial cell and a second spatial cell, the first tabular cell being associated with the first spatial cell in a first data display row, the second tabular cell being associated with the second spatial cell in a second data display row, wherein the tabular column displays the display data in a tabular form and the spatial column displays the plurality of relations within the display data in a spatial form;
>
> displaying a first data identifier for the first display data in the first tabular cell;
>
> displaying, in the first spatial cell, a first spatial identifier representing the first display data, the first spatial identifier comprising a horizontal bar common spatial identifier with a horizontal length, the horizontal length indicating an amount of the plurality of relations between the first display data and the other display data;
>
> displaying a second data identifier for the second display data in the second tabular cell;
>
> displaying, in the second spatial cell, a second spatial identifier representing the second display data; and
>
> displaying a plurality of spatial connectors connecting the first spatial identifier to spatial identifiers for the other display data according to the relations, the spatial identifiers for the other display data including the second spatial identifier.

10. The computer program product of claim 9 wherein the data display has a supplementary tabular column, the supplementary tabular column having a first supplementary tabular cell and a second supplementary tabular cell, the first supplementary tabular cell being associated with the first tabular cell in the first data display row, the second supplementary tabular cell being associated with the second tabular cell in the second data display row, the operations further comprising:

> displaying a first supplementary data for the first display data in the first supplementary tabular cell; and
>
> displaying a second supplementary data for the second display data in the second supplementary tabular cell.

11. The computer program product of claim 9 wherein the second spatial identifier comprises a ball spatial identifier.

12. The computer program product of claim 9, the operations further comprising:

> selecting the first data display row; and
>
> highlighting the first data display row in response to the selecting.

13. The computer program product of claim 12 wherein the highlighting comprises applying an effect to the first data display row selected from the group consisting of fill, color, pattern, animation, and a combination thereof.

14. The computer program product of claim 9, the operations further comprising:

> displaying a plurality of spatial identifiers and a plurality of spatial connectors connected in a path from the first spatial identifier, and
>
> highlighting the path for a user-defined number of spatial identifiers from the first data display row.

15. The computer program product of claim 9 wherein the display data has a third display data, the operations further comprising:

> displaying a third spatial identifier for the third display data in a third spatial cell of a third data display row,
>
> selecting the first spatial identifier,
>
> selecting the third spatial identifier, and
>
> highlighting a full path between the first data display row and the third data display row in response to the selecting the first spatial identifier and the selecting the third spatial identifier.

16. The computer program product of claim 9, the operations further comprising:

> selecting at least one of the first spatial identifier, the second spatial identifier, and the spatial connector; and
>
> highlighting a surrounding area around the first spatial identifier, the second spatial identifier, and the spatial connector in response to the selecting.

17. The computer program product of claim 9, the operations further comprising:

> displaying a plurality of relation groups in the spatial column; and
>
> ordering the plurality of relation groups across the spatial column by length of common spatial identifiers for each of the plurality of relation groups.

18. The computer program product of claim 9, the operations further comprising:

> displaying a plurality of relation groups in the spatial column, the plurality of relation groups having a spatial connector summed length; and
>
> sorting the plurality of relation groups in the spatial column to minimize the spatial connector summed length.

19. The computer program product of claim 9, the operations further comprising:

> displaying a plurality of relation groups in the spatial column; and
>
> sorting the plurality of relation groups in the spatial column by a criterion selected from the group consisting of sorting by summed length of single relation group spatial connectors, sorting by number of single relation group spatial connectors, sorting by number of single relation group spatial identifiers, and sorting by relation group weighting factors.

* * * * *